S. WHITNUM
Fire-Shovel.
No. 210,732. Patented Dec. 10, 1878.
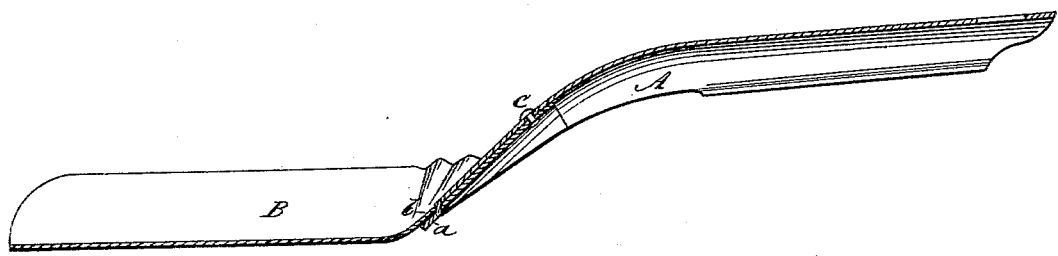
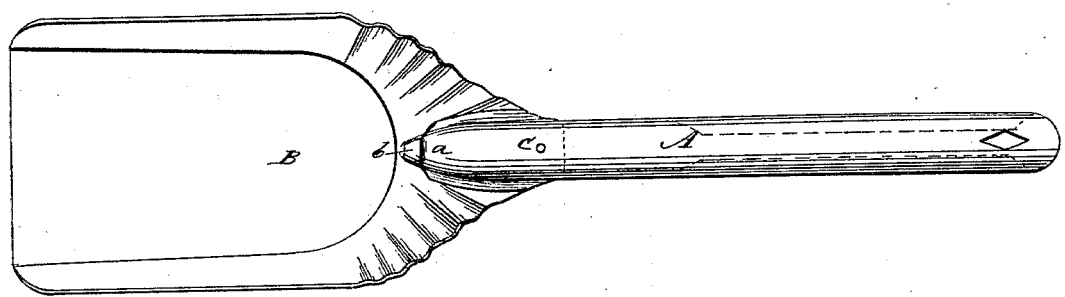
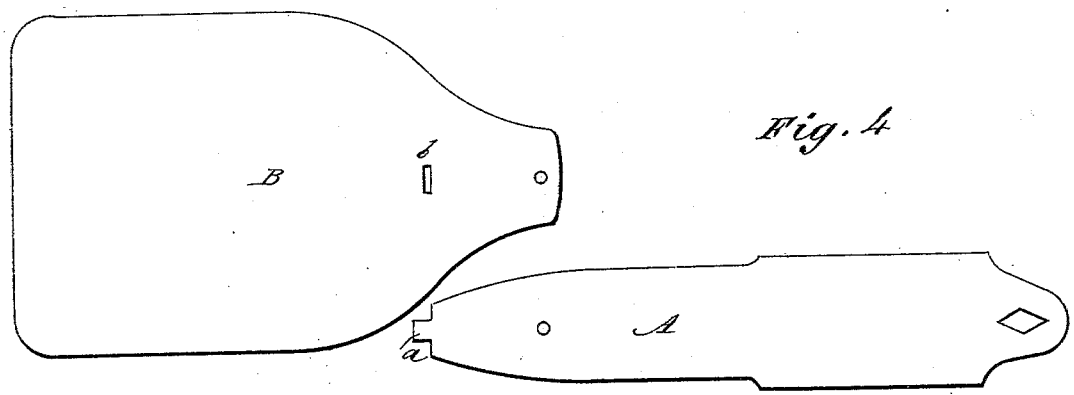
WITNESSES:
C. Neveux
C. Sedgwick
INVENTOR:
S. Whitnum
BY Munn & Co
ATTORNEYS.

UNITED STATES PATENT OFFICE.

SAMUEL WHITNUM, OF GREEN POINT, NEW YORK.

IMPROVEMENT IN FIRE-SHOVELS.

Specification forming part of Letters Patent No. 210,732, dated December 10, 1878; application filed August 1, 1878.

*To all whom it may concern:*

Be it known that I, SAMUEL WHITNUM, of Green Point, in the county of Kings and State of New York, have invented a new and Improved Fire-Shovel, of which the following is a specification:

My invention consists in a novel construction of a fire-shovel having its handle and blade made in two separate pieces, and a novel mode of attaching said handle and blade to each other, whereby greater economy of material is effected and a stronger shovel is produced than when made in a single piece.

In the accompanying drawing, Figure 1 represents a top view of a shovel constructed according to my invention. Fig. 2 is a longitudinal sectional view of the same. Figs. 3 and 4 represent the blanks from which the blade and handle are made.

Similar letters of reference indicate corresponding parts.

The handle A and blade B are made from blanks of the form shown in Figs. 3 and 4. The blade B is formed with a short neck or narrow extension at its upper end in the direction of the handle, and at about the point where the blade vanishes into this neck is a transverse slot, $b$.

The handle A is formed with a lip or tongue, $a$, of a width corresponding with the length of the slot $b$, and of any suitable length.

The handle and blade are connected and secured together by inserting the lip or tongue $a$ into the slot $b$, and fastening the whole by a single rivet, $c$, passed through both blanks at a point near the upper end of the neck of the blade. The two blanks thus connected and secured together are then subjected to a stamping and pressing process, for the purpose of forming the finished shovel, which may partake of the general form represented in Figs. 1 and 2.

By this mode of constructing a shovel a great saving of material is effected, as the handles may be cut from strips which are wasted when the handle and blade are made in one piece. By this mode of construction, also, the shovel is much stronger than if made in a single piece, as the greatest strength is given, by reason of the double thickness of metal, to the part which is most needed—namely, the neck or point of junction of the blade and handle.

I am aware that a lip is not, broadly, new; or a handle riveted and secured by metal straps; or a handle secured by bending its ends into apertures and back, solder being then used; or a handle secured by being passed through slots and bent against the sides; but

What I claim is—

A shovel consisting of the two pieces A B, the former secured on a short neck of the latter by a tongue and slot, $a$ $b$, and a single rivet, as shown and described.

S. WHITNUM.

Witnesses:
 E. R. BROWN,
 C. SEDGWICK.